(12) United States Patent
McCallum et al.

(10) Patent No.: US 6,575,407 B2
(45) Date of Patent: Jun. 10, 2003

(54) SUBDERMALLY-REINFORCED ELASTOMERIC TRANSITIONS

(75) Inventors: Brent N. McCallum, Benbrook, TX (US); Kendall G. Young, Crowley, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/943,271

(22) Filed: Aug. 30, 2001

(65) Prior Publication Data

US 2002/0043590 A1 Apr. 18, 2002

Related U.S. Application Data

(60) Provisional application No. 60/241,507, filed on Oct. 18, 2000.

(51) Int. Cl.[7] .............................................. B64C 39/00
(52) U.S. Cl. .......................................... 244/133; 16/225
(58) Field of Search ................................. 244/133, 219, 244/123; 160/236; 16/225

(56) References Cited

U.S. PATENT DOCUMENTS

| 5,222,699 A | | 6/1993 | Albach et al. ............... 244/213 |
| 5,569,508 A | * | 10/1996 | Cundiff ....................... 428/117 |
| 5,780,157 A | * | 7/1998 | Tuffias et al. ............... 244/133 |
| 5,794,893 A | | 8/1998 | Diller et al. ................. 246/213 |
| 5,803,405 A | | 9/1998 | Ellis et al. ................... 244/130 |
| 5,810,291 A | | 9/1998 | Geiger et al. ............... 244/133 |
| 5,839,698 A | * | 11/1998 | Moppert ...................... 244/217 |
| 5,941,480 A | * | 8/1999 | Wille ......................... 244/123 |
| 5,988,567 A | | 11/1999 | Wille ....................... 244/129.5 |
| 6,145,791 A | * | 11/2000 | Diller et al. ................. 244/130 |
| 6,173,925 B1 | * | 1/2001 | Mueller et al. ............. 244/123 |
| 6,276,641 B1 | * | 8/2001 | Gruenewald et al. ....... 244/213 |

FOREIGN PATENT DOCUMENTS

GB 2133457 A * 7/1984 ............. E05D/1/02

* cited by examiner

Primary Examiner—Peter M. Poon
Assistant Examiner—Timothy D Collins
(74) Attorney, Agent, or Firm—Bracewell & Patterson, L.L.P.

(57) ABSTRACT

A subdermally-reinforced elastomeric transition is provided in which an elastomeric skin is attached to a plurality of subdermal supporting members that engage subdermal reinforcing members. The reinforcing members may be rods or support rails which the supporting members engage. The supporting members may be attached to the elastomeric skin in an orientation that is perpendicular to a direction of strain of the skin and may have a plurality of holes or slots for receiving the reinforcing members. Alternatively, the supporting members may be oriented to be parallel to the direction of strain of the skin, the reinforcing members being located substantially within the supporting members.

9 Claims, 4 Drawing Sheets

SUBDERMALLY-REINFORCED ELASTOMERIC TRANSITIONS

CROSS REFERENCE TO RELATED APPLICATIONS

This application claims the benefit of Applicant's copending U.S. provisional application, Ser. No. 60/241,507, filed on Oct. 18, 2000.

BACKGROUND OF THE INVENTION

1. Field of the Invention

The present invention relates in general to an improved aircraft structure, and more particularly to subdermally-reinforced elastomeric transitions for sealing apertures or gaps.

2. Description of the Prior Art

Modem aircraft have both external aerodynamic control surfaces and a number of exterior access panels such as for weapons bay, landing gears, and avionics access. These panels, or doors, are typically fabricated from a variety of metallic and composite materials to reduce weight. The control surfaces and doors form discontinuous gaps or apertures with aircraft skin elements that are located adjacent to the control surfaces and doors, such as at hinge lines. Aperture windows and maintenance access panels also form gaps with the aircraft skin.

All gaps on an aircraft must be sealed to reduce aerodynamic drag and turbulence and to prevent dirt and contaminants from entering the aircraft. In military applications, the gaps must also be sealed to eliminate gaps between surfaces and reduce electromagnetic emissions, both of which contribute to the radar signature of aircraft. Also, the seal for gaps requires time-consuming and costly maintenance. Hence, there is a need to reduce or minimize the running length of gaps on the aircraft to reduce aerodynamic drag and radar cross-section during flight as well as to reduce maintenance time on the ground. Further, there is a need to reduce or minimize the number of gaps for moveable aircraft members, such as doors, preferably to at least one gap for such members.

Elastomeric transition panels are used to seal gaps or apertures between various moveable aircraft members such as access doors, access panels and aperture windows. There are dimensional changes in the size and shape of the doors which, in turn, cause dimensional changes in the gaps, due to the large strains and temperature variations modem aircraft encounter during flight. Strains on the order of 20% to 30% may be encountered for door hinge lines and bay doors. Elastomeric transition panels are designed to be elastic to adjust to these strain-induced and thermal-induced dimensional changes.

Elastomeric transition panels are often reinforced to impart improved flexural strength while preserving high in-plane strain capacity. A prior art elastomeric transition panel, continuous moldline technology (CMT), is disclosed in U.S. Pat. No. 5,222,699 to Albach, et al. In the CMT panel, a reinforcement member is encapsulated within a thick solid elastomeric block, the size of the reinforcement member determining the thickness of the elastomeric block. As a result, the CMT panel is heavy and difficult to actuate when used in CMT airframe applications. Also, the CMT panel is labor-intensive to manufacture and maintain and is often short-lived and unreliable during service. There is a need for a lightweight, reinforced, elastomeric transition panel having a substantially thin elastomeric section with improved flexural strength and high strain capacity. Also, such a panel is needed which may be subdermally reinforced and which may incorporate flexible cores.

SUMMARY OF THE INVENTION

A subdermally-reinforced elastomeric transition is provided in which an elastomeric skin is attached to a plurality of subdermal supporting members that engage subdermal reinforcing members. The reinforcing members may be rods or support rails which the supporting members engage. The supporting members may be attached to the elastomeric skin in an orientation that is perpendicular to a direction of strain of the skin and may have a plurality of holes or slots for receiving the reinforcing members. Alternatively, the supporting members may be oriented to be parallel to the direction of strain of the skin, the reinforcing members being located substantially within the supporting members.

DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DESCRIPTION OF THE INVENTION

Elastomeric transitions may be used to seal a gap, slit or aperture. These gaps may be between the skin of a wing and aerodynamic control surfaces, between the skin of an aircraft and doors, or between edges of a pair of doors. At least a portion of the control surfaces or doors may be fabricated from elastomeric transition material, such as hinge-line transition covers. Alternatively, entire doors may be fabricated from elastomeric transition material. Each elastomeric transition may be formed with a thin skin or with a skin having a sandwich structure.

Figure 1:
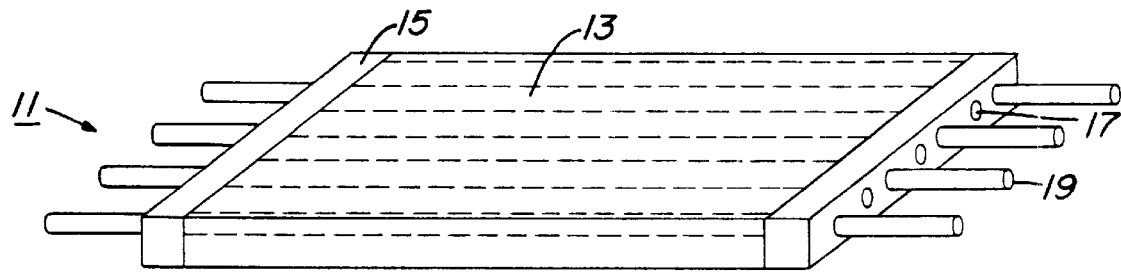
FIG. 1 is a perspective view of a prior art continuous-moldline technology (CMT) elastomeric transition panel.

FIG. 1 shows a prior art continuous-moldline technology (CMT) elastomeric transition panel 11. Panel 11 has a thick, solid elastomeric section 13 located between panel edge members 15. Elastomeric section 13 and edge members 15 have mutually aligned holes 17. Rods 19 are inserted into holes 17 in elastomeric section 13 and edge members 15 for strengthening and supporting panel 11. Further details of how to make and use the CMT panel are disclosed in U.S. Pat. No. 5,222,699 to Albach, et al., incorporated by reference herein.

Figure 2:
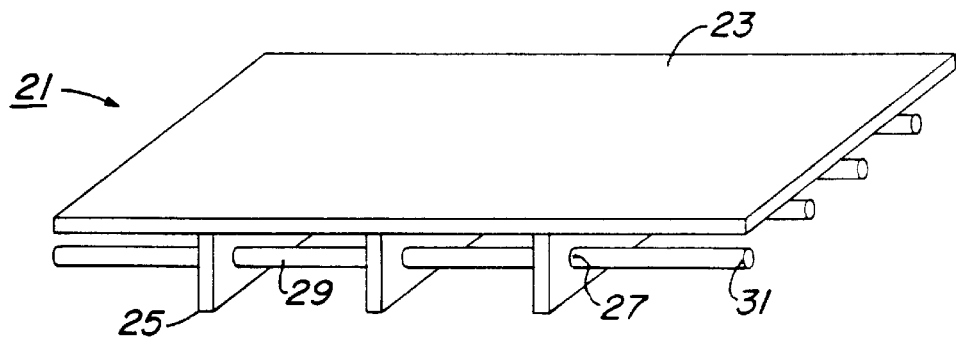
FIG. 2 is a top, perspective view of a first embodiment of a subdermally-reinforced elastomeric transition constructed in accordance with this invention.

FIG. 2 shows a first embodiment of a subdermally-reinforced elastomeric transition (SRET) panel 21. The word "subdermal" is used herein to mean a structure in which at least a portion of the structure is disposed below, and external to, a planar material. Panel 21 is an elastomeric composite having a substantially-horizontal skin 23 disposed above and attached to a plurality of substantially-vertical, downwardly-extending supporting members 25. Skin 23 is formed from an elastomeric material such as silicone rubber, fluorosilicone rubber, or polyurethane rubber. Alternatively, skin 23 can be formed from other suitable rubberized material, for example, a three-dimensional (3-D), woven preform in which the upper surface is infused with an elastomeric substance and the vertical, supporting members are infused with a rigid resin. When a woven preform is used, it should be oriented to stretch in the direction that is substantially perpendicular to supporting members 25. Skin 23 may also be a sandwich structure containing a flexible inner core, such as a honeycomb or foam core. Skin 23 preferably has a thickness of about 0.25 to 0.30 inches. The terms "horizontal" and "vertical" are used for convenience herein, as panel 21 may be used in various orientations.

Supporting members 25 are orthogonally attached to skin 23 by any suitable means. Supporting members 25 are rigid, load-bearing structural members which may be fabricated woven preforms and which preferably extend for a substantial portion of the lateral width of skin 23. If a woven preform is used, as described above, the portion of the preform that serves as supporting members 25 may be infused with a thermosettable resin such as epoxy, polyimide or other suitable rigid polymer. Supporting members 25 may have a height of about 1.25 inches and a width of about 0.125 inches, supporting members 25 being separated from each other by about 1 inch. Preferably, supporting members 25 are parallel to each other in their resting positions. In this embodiment, supporting members 25 are uniformly spaced apart from each other, though this is not always required. Supporting members have a plurality of holes 27 for receiving reinforcing members 29.

Figure 3:
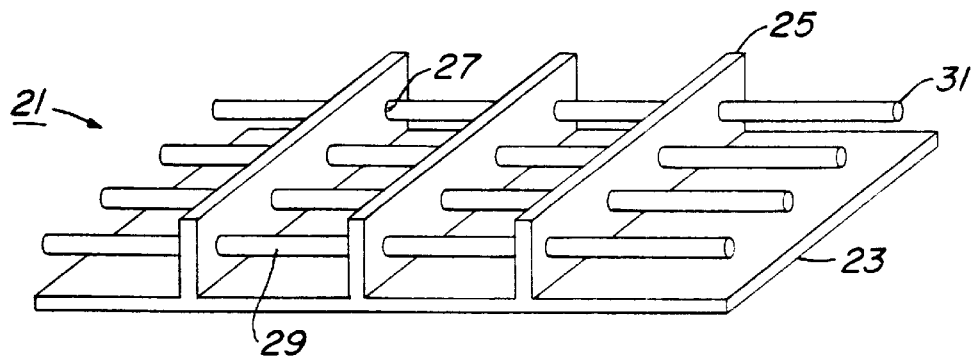
FIG. 3 is a bottom, perspective view of the subdermally-reinforced elastomeric transition of FIG. 2.

Reinforcing members 29 are removably inserted into holes 27 for slidingly engaging holes 27, thereby locating supporting members 25 and skin 23 along a desired path. Each reinforcing member 29 is a rigid, load bearing structural member formed of metal, rigid composites, or similar materials and may be constructed as a rod, a tube, a slat or the like. End 31 of member 29 may be secured to the surfaces surrounding the gap being sealed using any suitable attachment means, such as a slide, pivot or uniball fittings, or other means known in the art. In a preferred embodiment, member 29 is aligned in an orthogonal or perpendicular direction to the gap or slit sealed by the elastomeric transition, though member 29 may also be at other angles. Member 29 may have an outer diameter of about 0.50 inches. FIG. 3 is a bottom, perspective view of panel 21 and shows the supporting members 25 with reinforcing members 29, shown as a rod, inserted into holes 27.

During use of panel 21, strain in skin 23 is induced as the forward (left in the figure) and rearward (right in the figure) edges of skin are pulled in opposite directions, the primary strain being in a longitudinal direction and parallel to members 29. Since supporting members 25 are integral with or bonded to the inner surface of skin 23, the space between supporting members 25 increases as skin 23 stretches. Aerodynamic forces above skin 23 may tend to pull skin 23 outward or push skin 23 inward, but the combination of the rigidity of supporting members 25 and reinforcing members 29 maintain panel 21 in the desired shape. Though some compression of skin 23 beyond its nominal length is possible, normal use preferably will cause only positive strain on skin 23, as described below. Reinforcing members 29 do not stretch when skin 23 stretches, however members 29 may be formed to allow lengthening of members 29 through use of telescoping portions (not shown).

Figure 4:
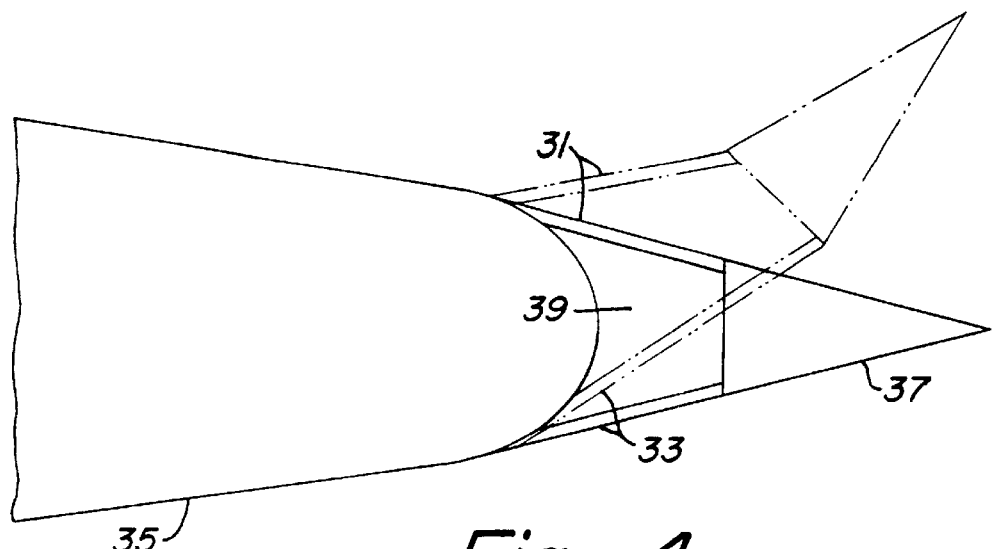
FIG. 4 is a schematic side view of an installed elastomeric transition in accordance with this invention.

FIG. 4 is a schematic, cross-sectional view that shows an example installation of upper elastomeric transition panel 31 and lower elastomeric transition panel 33, each panel 31, 33 being constructed like panel 21 (FIGS. 2 and 3). Panels 31, 33 are used to seal a volume 39 in the gap between the rear portion of an aircraft wing 35 and the front portion of a trailing-edge, aerodynamic control surface 37. The forward edges of panels 31, 33 are attached to wing 35, and the rearward edges of panels 31, 33 are attached to control surface 37. Reinforcing members 29 extend in a longitudinal or forward/rearward direction, and supporting members 25 are perpendicular to reinforcing members 29.

Control surface 37 deploys through rotation and rearward translation (to the right in the figure), rather than being attached to wing 35 using a simple hinge. In its undeployed position, shown by the solid lines, control surface 37 trails behind wing 35, each panel 31, 33 being in a non-strained or slightly-strained condition. As control surface 37 rotates upward and rearward to its deployed position, shown in phantom by dotted lines, panel 31 may stretch slightly, whereas panel 33 undergoes significant stretching to maintain the seal between the lower portions of wing 35 and control surface 37. As supporting members 25 move apart from each other during stretching of panels 31, 33, members 25 will slide relative to reinforcing members 29. As control surface 37 is moved back to the solid-line position, panels 31, 33 contract and return to their nominal sizes. Though not shown in the figure, rotating control surface 37 downward and rearward produces a similar significant stretching in panel 31, whereas little or no stretching may occur in panel 33.

Figure 5:
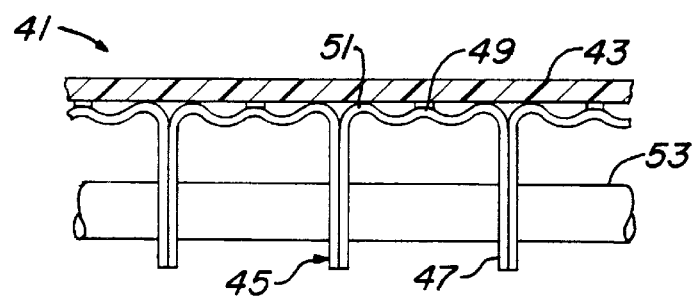
FIG. 5 is a cross-sectional side view of an alternative embodiment of this invention.

An alternate design for supporting members that serve the same functions as supporting members 25 (FIGS. 2 and 3) is shown in FIG. 5. FIG. 5 is a cross-sectional side view depicting an elastomeric transition panel 41 comprising a skin 43 and a plurality of rigid, generally-U-shaped supporting members 45 that extend into the viewing plane for a substantial lateral width of skin 43. Supporting members 45 will typically be formed from metal or composites. Alternatively, supporting members 45 may be formed from metal. Supporting members 45 comprise planar portions 47 depending from an undulating upper portion having a central ridge 49 and two outer ridges 51. Planar portions 47 have holes (not shown) for slidingly receiving rigid reinforcing members 53, which locate supporting members 45. To attach supporting members 45 to skin 43, central ridge 49 is bonded to the inner surface of skin 43, whereas outer ridges 51 are not bonded to skin 43. As skin 43 stretches during use, the inner surface of skin 43 slides against outer ridges 51 of each supporting member. A significant advantage to using supporting members 45 in place of supporting members 25 is that the unsupported span of skin 43 between supporting members 45 is minimized. Also, supporting members 45 provide a resisting couple to limit rotation of supporting members 45, preventing binding of supporting members 45 on reinforcing members 53.

Figure 6:
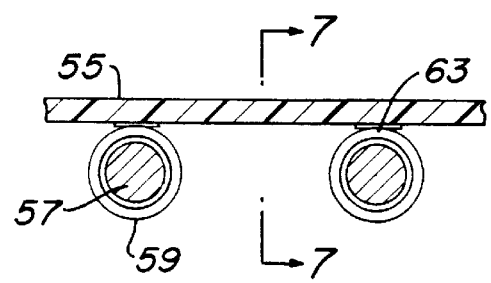
FIG. 6 is a cross-sectional end view of a second alternative embodiment of this invention.
Figure 7:
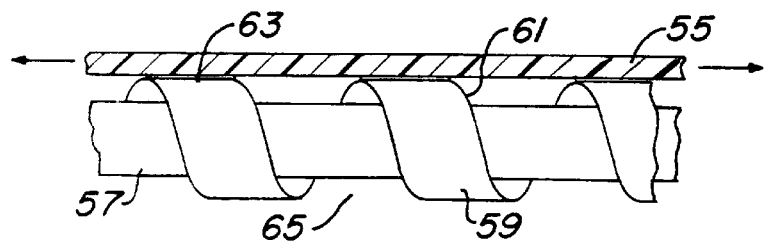
FIG. 7 is a cross-sectional side view of the embodiment of FIG. 6.

FIGS. 6 and 8 through 12 are cross-sectional end views that illustrate alternative means for slidingly attaching an elastomeric skin 55 to reinforcing members 57. FIGS. 6 and 7 show reinforcing members 57 as rods having a circular cross section, but members 57 may also be circular tubes. Each member 57 is located within a tube 59, preferably formed from PTFE, tube 59 having a coil slit 61 in its outer wall along a significant portion of its longitudinal length (into the viewing plane in the cross-sectional view of FIG. 6). Upper portions 63 of tube 59 are attached to the underside of skin 55 using adhesive or other suitable means of attachment. FIG. 7 is a profile view through section 7—7 of FIG. 6 and shows skin 55 in a stretched condition, the forward and rearward edges being pulled left and right, respectively. When skin 55 undergoes positive strain, gaps 65 open between sections of tube 59 and along slit 61, allowing skin 55 to stretch while remaining connected to tube 59. Tube 59 may also slide on reinforcing member 57 as skin 55 stretches. As strain in skin 55 is reduced, gaps 65 narrow.

Figure 8:
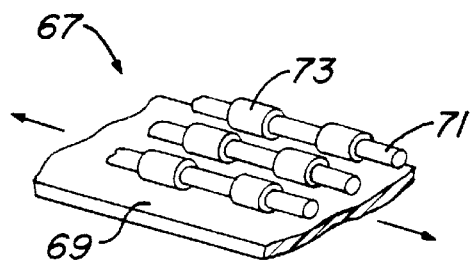
FIG. 8 is a bottom, perspective view of a third alternative embodiment of this invention.

FIG. 8 is a perspective view that shows the inner surface of an elastomeric transition panel 67 comprising an elastomeric skin 69 and reinforcing rods 71. Rods 71 are slidingly located within cylindrical tube sections 73 that are attached to the inner surface of skin 69. Tube sections 73 may be formed from rigid materials such as metal or plastic, or they may be formed from composite materials. When skin 69 is in an unstretched condition, tube sections 73 are near to or in contact with each other. When skin 69 is in the stretched condition, as shown in FIG. 8, sections 73 are moved away from each other.

Figure 9:
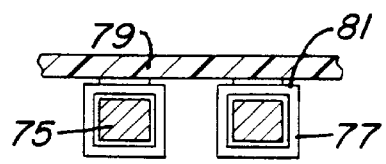
FIG. 9 is a cross-sectional end view of a fourth alternative embodiment of this invention.
Figure 10:
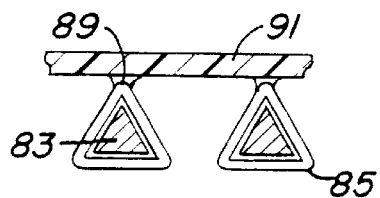
FIG. 10 is a cross-sectional end view of a fifth alternative embodiment of this invention.
Figure 11:
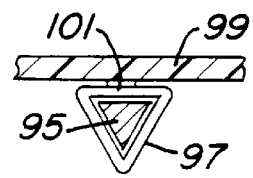
FIG. 11 is a cross-sectional end view of a sixth alternative embodiment of this invention.

FIGS. 9, 10, and 11 are cross-sectional views that illustrate reinforcing members and corresponding tube sections in the shapes of squares, triangles, and inverted triangles, respectively. FIG. 9 shows square rods 75 and square tube sections 77, sections 77 being connected to skin 79 at upper portions 81. FIG. 10 shows triangular reinforcing members 83 and triangular tube sections 85, sections 85 being attached at upper sections 89 to elastomeric skin 91. FIG. 11 shows an inverted triangular rod 95 and tube section 97 connected to skin 99 at upper portion 101. The tube sections in these embodiments slide relative to the rods when the skin is stretched.

Figure 12:
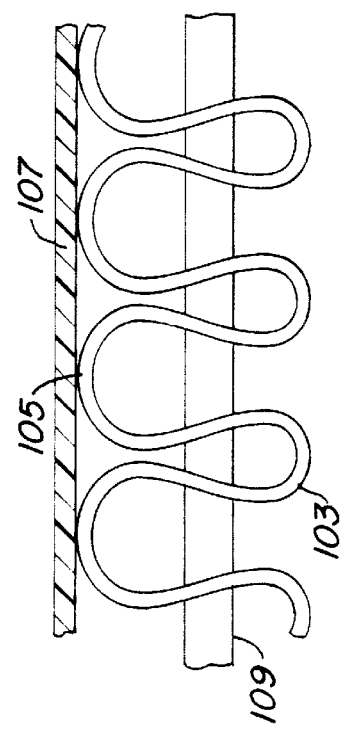
FIG. 12 is a cross-sectional side view of a seventh alternative embodiment of this invention.

An additional alternative to supporting members 25 (FIGS. 2 and 3) is the continuous supporting member 103 shown in FIG. 12. Instead of individual supporting members extending across the width of an elastomeric skin, member 103 is a continuous, preferably composite, ribbon 4 or sheet. Member 103 may alternatively be formed from metal, such as spring steel. Upper portions 105 of member 103 are adhered to skin 107, and reinforcing member 109 is inserted through holes (not shown) in the vertical or bight portions of support member 103. When skin 107 is stretched, the bight portions of member 103 separate and slide relative to reinforcing member 109.

Figure 13:
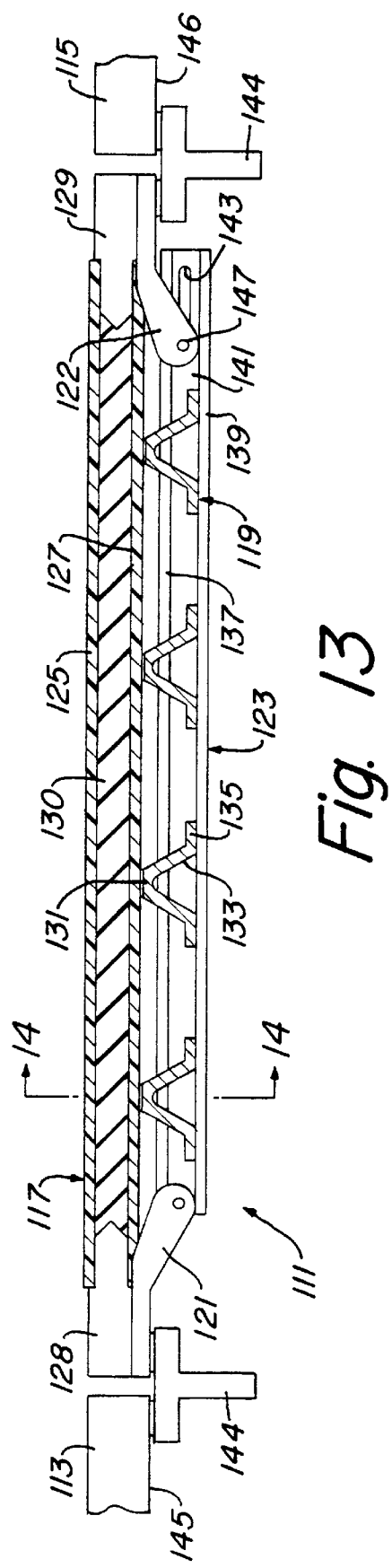
FIG. 13 is a cross-sectional side view of an eighth alternative embodiment of this invention.

Rather than using rods as reinforcing members, an alternative embodiment of the present invention uses rails to retain and reinforce supporting members. FIG. 13 is a side, cross-sectional view of a SRET panel 111 having reinforcing rails. Panel 111 is designed to undergo strain from being stretched in a longitudinal direction (left to right as shown in FIG. 13) and return to its nominal size, but panel 111 is not meant to undergo compression. An aircraft wing 113 is located near a trailing-edge, aerodynamic control surface 115, though only the rear edge of the upper surface of wing 113 and the forward edge of the upper surface of control surface 115 are shown in the figure. Panel 111 comprises an elastomeric skin 117, a plurality of supporting members 119, brackets 121,122, and reinforcing members 123. Skin 117 is preferably a sandwich structure formed from two elastomeric sheets 125, 127, edge members 128, 129, and a flexible inner core 130. Sheets 125, 127 are made from elastomeric materials, such as silicone rubber, fluorosilicone rubber, polyurethane rubber or other suitable rubberized material and are attached to the upper and lower surfaces, respectively, of edge members 128, 129. Inner core 130 may be made from foam rubber, expanded polymers or honeycomb core. Alternatively, sheets 125, 127 and inner core 129 may be fabricated from a stretchable woven nylon preform material infused with an elastomeric material, such as those noted above. Skin 117 may have a thickness of about 0.5 to 0.6 inches. Sheets 125, 127 may have a thickness of about 0.05 inches, whereas inner core 129 may have a thickness of about 0.4 inches.

Supporting members 119 are preferably formed as "hat" sections, each comprising an upper section 131, two legs 133, and two flange sections 135. Upper section 131 of each member 119 is bonded to the inner surface, or underside, of sheet 127 of skin 117. Legs 133 depend from upper section 131 and terminate in horizontal flange sections 135. Supporting members 119 preferably extend for a substantial portion of the lateral width (into the viewing plane of FIG. 13) of panel 111 and are rigid structures that may be formed from various materials, including metal or composites. Supporting members 119 maintain a generally-fixed vertical distance between sheet 127 and the top of reinforcing member 123, vertical loads on skin 117 being transferred through supporting members 119 to reinforcing member 123.

Reinforcing members 123 are formed as an I-beam, each having an upper flange 137, a lower flange 139, a web 141, and a slot 143 in the rear portion of web 141. Brackets 121 are attached to edge member 128, and caps 144 attach brackets 121 to surface 145 of wing 113. Likewise, brackets 122 are attached to edge member 129, and caps 144 attach brackets 122 to surface 146 of control surface 115. Brackets 121, 122 are connected by pins 147 to reinforcing members 123, bracket 121 being pivotally connected to the forward portion of reinforcing members 123, and bracket 122 being pivotally and slidingly connected to the rear portion of member 123 at slot 143. Supporting members 119 slidingly engage reinforcing members 123

Figure 14:
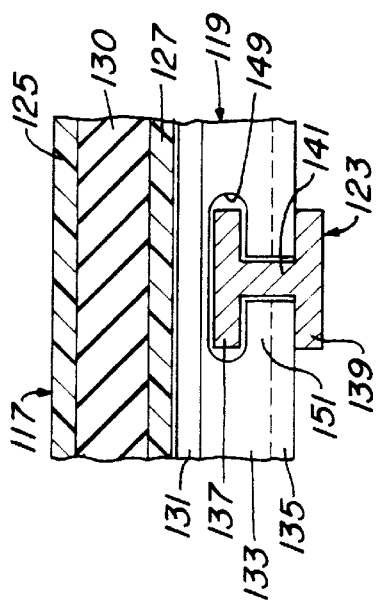
FIG. 14 is a cross-sectional end view of the embodiment of FIG. 13.

FIG. 14 is a cross-sectional view taken through section 14—14 of FIG. 13. Skin 117 is shown attached to supporting member 119, member 119 being slidingly engaged by reinforcing member 123. Supporting members 119 have mushroom-shaped cutouts 149 through each leg 133 and flange section 135 for receiving reinforcing member 123. Each cutout 149 forms two opposing extensions 151 that engage reinforcing member 123 between upper flange 137 and lower flange 139 alongside web 141. Cutouts 149 may be formed in supporting members 119 prior to assembly with skin 117, or cutouts 149 may be formed in members 119 after assembly. Reinforcing members 123 are inserted into aligned cutouts 149 to slidingly engage extensions 151.

During operation, aircraft wing 113 remains stationary relative to control surface 115, control surface 115 being rotated and moved rearward to produce an aerodynamic effect. When panel 111 is installed, skin 117 is placed in an unstretched or slightly-stretched condition. As control surface 115 moves during deployment, sheets 125, 127 and core 129 of skin 117 stretch to maintain the seal between wing 113 and control surface 115. As skin 117 elongates from its installed length, the longitudinal distance between supporting members 119 increases, members 119 sliding on reinforcing members 123. Each reinforcing member 123 rotates relative to bracket 121, and bracket 122 rotates and slides relative to member 123, pins 147 sliding in slot 143. As control surface 115 is moved back to its undeployed position, skin 117 contracts to its installed size.

The advantages of the invention are as follows. The subdermally-reinforced elastomeric transition have thin cross sections and may incorporate flexible cores, leading to reduced weight and in-plane modulus. Fabrication of the transitions is simplified because the reinforcements are not encapsulated, leading to easier inspection, maintenance and repair.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

We claim:

1. An elastomeric transition for spanning a gap between first and second surfaces, the transition comprising:
    an elastomeric skin, a first edge of the skin adapted to be attached to the first surface, a second edge adapted to be attached to the second surface;
    supporting members mounted to and extending from the skin;
    external reinforcing members carried by and slidingly engaging the supporting members, the reinforcing members being spaced from an inner surface of the skin, the supporting members and the reinforcing members being movable relative to each other to allow stretching of the skin, the supporting members sliding in a direction parallel to a length of the reinforcing members the supporting members are spaced apart from each other and generally perpendicular to a direction of primary strain of the skin, such that a spacing between the supporting members changes during stretching of the skin.

2. An elastomeric transition for spanning a gap between first and second surfaces, the transition comprising:
    an elastomeric skin, a first edge of the skin adapted to be attached to the first surface, a second edge adapted to be attached to the second surface;
    supporting members mounted to and extending from the skin; and
    external reinforcing members carried by the supporting members and spaced from an inner surface of the skin, the supporting members and the reinforcing members being movable relative to each other to allow stretching of the skin; wherein
        the supporting members are webs that are perpendicular to a plane of the skin, the supporting members having a plurality of holes formed therethrough; and
        the reinforcing members slidingly engage the supporting members by passing through the holes in the supporting members.

3. An elastomeric transition for spanning a gap between first and second surfaces, the transition comprising:
    an elastomeric skin, a first edge of the skin adapted to be attached to the first surface, a second edge adapted to be attached to the second surface;
    supporting members mounted to and extending from the skin; and
    external reinforcing members carried by the supporting members and spaced from an inner surface of the skin, the supporting members and the reinforcing members being movable relative to each other to allow stretching of the skin; wherein
        the supporting members comprise tubes having helical slits extending along the length of the supporting members.

4. An elastomeric transition for spanning a gap between first and second surfaces, the transition comprising:
    an elastomeric skin, a first edge of the skin adapted to be attached to the first surface, a second edge adapted to be attached to the second surface;
    supporting members mounted to and extending from the skin;
    external reinforcing members carried by and slidingly engaging the supporting members, the reinforcing members being spaced from an inner surface of the skin, the supporting members and the reinforcing members being movable relative to each other to allow stretching of the skin, the supporting members sliding in a direction parallel to a length of the reinforcing members; and wherein:
        the supporting members comprise tube sections divided into discrete portions, the portions being movable relative to each other to allow stretching of the skin.

5. The elastomeric transition of claim 4, wherein:
    the cross-sectional shape of the supporting members is selected from the group consisting of a circle, a square, and a triangle.

6. An elastomeric transition for spanning a gap between first and second surfaces, the transition comprising:
    an elastomeric skin, a first edge of the skin adapted to be attached to the first surface, a second edge adapted to be attached to the second surface;
    rigid supporting members mounted to and extending from the skin;
    rigid, fixed-length, external reinforcing members carried by the supporting members and spaced from an inner surface of the skin, the supporting members and the reinforcing members being movable relative to each other to allow stretching of the skin; wherein
        the supporting members and the reinforcing members are generally perpendicular to and slidingly engage each other, the supporting members sliding in a direction parallel to a length of the reinforcing members; and wherein:
            the supporting members are spaced apart from each other and generally perpendicular to a direction of primary strain of the skin, such that a spacing between the supporting members changes during stretching of the skin.

7. An elastomeric transition for spanning a gap between first and second surfaces, the transition comprising:
    an elastomeric skin, a first edge of the skin adapted to be attached to the first surface, a second edge adapted to be attached to the second surface;

supporting members mounted to and extending from the skin; and rigid, external reinforcing members carried by the supporting members and spaced from an inner surface of the skin, the supporting members and the reinforcing members being movable relative to each other to allow stretching of the skin; wherein the supporting members and the reinforcing members are generally parallel to and slidingly engage each other; and the supporting members comprise tubes having helical slits extending along the length of the supporting members.

8. An elastomeric transition for spanning a gap between first and second surfaces, the transition comprising:

an elastomeric skin, a first edge of the skin adapted to be attached to the first surface, a second edge adapted to be attached to the second surface;

supporting members mounted to and extending from the skin;

rigid, external reinforcing members carried by the supporting members and spaced from an inner surface of the skin, the supporting members and the reinforcing members being movable relative to each other to allow stretching of the skin; wherein the supporting members and the reinforcing members are generally parallel to and slidingly engage each other; and wherein:

the supporting members comprise tube sections divided into discrete portions, the portions being movable relative to each other to allow stretching of the skin.

9. The elastomeric transition of claim 8, wherein:

the cross-sectional shape of the supporting members is selected from the group consisting of a circle, a square, and a triangle.

* * * * *